United States Patent
Rieken

(10) Patent No.: US 9,461,700 B2
(45) Date of Patent: Oct. 4, 2016

(54) MAINS-SYNCHRONOUS POWER-LINE COMMUNICATIONS SYSTEM AND METHOD

(75) Inventor: David W. Rieken, St. Peters, MO (US)

(73) Assignee: Aclara Technologies LLC, St. Louis, MO (US)

(*) Notice: Subject to any disclaimer, the term of this patent is extended or adjusted under 35 U.S.C. 154(b) by 0 days.

(21) Appl. No.: 13/988,461

(22) PCT Filed: Nov. 30, 2011

(86) PCT No.: PCT/US2011/062510
§ 371 (c)(1),
(2), (4) Date: Jul. 2, 2013

(87) PCT Pub. No.: WO2012/075063
PCT Pub. Date: Jun. 7, 2012

(65) Prior Publication Data
US 2013/0279546 A1    Oct. 24, 2013

Related U.S. Application Data

(60) Provisional application No. 61/442,956, filed on Feb. 15, 2011, provisional application No. 61/419,091, filed on Dec. 2, 2010.

(51) Int. Cl.
*H04B 1/00* (2006.01)
*H04B 1/7097* (2011.01)
*H04B 3/54* (2006.01)
(Continued)

(52) U.S. Cl.
CPC ............ *H04B 1/7097* (2013.01); *H04B 3/546* (2013.01); *H04B 2203/5433* (2013.01); *H04J 11/003* (2013.01); *H04J 13/004* (2013.01)

(58) Field of Classification Search
CPC .. H04B 7/0854; H04B 7/0851; H04L 7/0029
USPC ......................................................... 375/146
See application file for complete search history.

(56) References Cited

U.S. PATENT DOCUMENTS 4,101,834 A * 7/1978 Stutt ...................... H04B 3/542
                                                              307/105
4,658,238 A    4/1987 Mak
(Continued)

FOREIGN PATENT DOCUMENTS

EP       1039715 A1    9/2000
WO       90/13950      11/1990
(Continued)

OTHER PUBLICATIONS

Rieken, David W., Maximum-Likelihood Estimation of the Frequency Response of a Low Frequency Power-Line Communication Channel, IEEE (2008), pp. 228-233.

*Primary Examiner* — Daniel Washburn
*Assistant Examiner* — Berhanu Tadese
(74) *Attorney, Agent, or Firm* — Senniger Powers LLP

(57) ABSTRACT

A transmitter transmits an outbound message signal via the power distribution system. The transmitter includes a spreader for spreading the spectrum of the communications signal before transmitting the outbound message signal. A receiver despreads the spectrum of the received digitized signal and digitally demodulates the received despread signal to generate the message. The transmitted signal is orthogonal to a source of interference on the power distribution system.

8 Claims, 5 Drawing Sheets

(51) Int. Cl.
*H04J 11/00* (2006.01)
*H04J 13/00* (2011.01)

(56) References Cited

U.S. PATENT DOCUMENTS

| | | | |
|---|---|---|---|
| 4,914,418 A | 4/1990 | Mak et al. | |
| 4,918,422 A | 4/1990 | Mak | |
| 4,963,853 A | 10/1990 | Mak | |
| 4,996,513 A | 2/1991 | Mak et al. | |
| 5,185,797 A * | 2/1993 | Barrett | H04K 1/00 380/273 |
| 5,198,796 A | 3/1993 | Hessling, Jr. | |
| 5,202,903 A * | 4/1993 | Okanoue | H04B 7/0845 375/341 |
| 5,262,755 A | 11/1993 | Mak et al. | |
| 5,473,533 A * | 12/1995 | Mengelt | H02J 3/40 307/66 |
| 5,486,805 A | 1/1996 | Mak | |
| 5,617,084 A | 4/1997 | Sears | |
| 5,696,441 A | 12/1997 | Mak et al. | |
| 5,844,949 A * | 12/1998 | Hershey | H04B 3/54 340/12.33 |
| 5,856,776 A | 1/1999 | Armstrong et al. | |
| 5,903,594 A * | 5/1999 | Saulnier | H04B 1/69 340/12.33 |
| 6,044,106 A | 3/2000 | Suzuki | |
| 6,101,214 A * | 8/2000 | Hershey | H04B 1/69 340/12.33 |
| 6,172,597 B1 | 1/2001 | Brown | |
| 6,278,357 B1 | 8/2001 | Croushore et al. | |
| 6,320,899 B1 | 11/2001 | Chang et al. | |
| 6,356,555 B1 * | 3/2002 | Rakib | H03M 13/256 348/E7.07 |
| 6,407,987 B1 * | 6/2002 | Abraham | H02J 13/0031 340/12.38 |
| 6,424,250 B1 * | 7/2002 | Puckette, IV | H04B 3/54 340/12.33 |
| 6,616,254 B1 * | 9/2003 | Raphaeli | H04B 1/69 375/135 |
| 6,940,396 B2 | 9/2005 | Hammond et al. | |
| 7,496,430 B2 | 2/2009 | Mak | |
| 7,593,378 B1 * | 9/2009 | Murali | H04W 52/0245 370/210 |
| 2002/0072879 A1 | 6/2002 | Sweitzer et al. | |
| 2002/0126741 A1 * | 9/2002 | Baum | H04B 1/7097 375/144 |
| 2003/0128746 A1 * | 7/2003 | Lerner | H04B 1/70775 375/148 |
| 2004/0100898 A1 * | 5/2004 | Anim-Appiah | H04L 1/206 370/210 |
| 2004/0218699 A1 * | 11/2004 | Carsello | H04L 7/042 375/343 |
| 2004/0222698 A1 | 11/2004 | Hammond et al. | |
| 2005/0055586 A1 | 3/2005 | Flen et al. | |
| 2006/0071776 A1 * | 4/2006 | White, II | H02J 13/0086 340/538 |
| 2007/0194949 A1 * | 8/2007 | Swarztrauber | G01D 4/004 340/870.07 |
| 2007/0211401 A1 | 9/2007 | Mak | |
| 2008/0030265 A1 * | 2/2008 | Ido | H04L 5/0023 329/317 |
| 2008/0225965 A1 | 9/2008 | Pi et al. | |
| 2008/0273581 A1 | 11/2008 | Kodama et al. | |
| 2009/0058728 A1 * | 3/2009 | Mostafa | H04L 25/03 342/380 |
| 2009/0201974 A1 * | 8/2009 | Song | H04B 1/707 375/147 |
| 2009/0257471 A1 * | 10/2009 | Tanaka | G01S 19/13 375/130 |
| 2010/0073193 A1 * | 3/2010 | Flammer, III | H04B 3/546 340/870.11 |
| 2010/0124288 A1 | 5/2010 | Spencer et al. | |
| 2010/0172427 A1 | 7/2010 | Kleider et al. | |
| 2011/0007782 A1 * | 1/2011 | Takahashi | G01S 19/30 375/149 |
| 2011/0109320 A1 * | 5/2011 | Curt | H04B 3/546 324/543 |
| 2011/0140911 A1 * | 6/2011 | Pant | H04B 3/546 340/870.02 |
| 2012/0037400 A1 | 2/2012 | Fields et al. | |
| 2012/0039400 A1 * | 2/2012 | Rieken | H03L 7/08 375/257 |
| 2012/0257682 A1 * | 10/2012 | Dabak | H04B 3/54 375/257 |
| 2013/0121426 A1 | 5/2013 | Drumeller | |
| 2014/0010271 A1 * | 1/2014 | Rydstrom | H04B 7/0854 375/224 |
| 2015/0092868 A1 * | 4/2015 | Rieken | H04B 3/542 375/257 |

FOREIGN PATENT DOCUMENTS

| | | |
|---|---|---|
| WO | WO 9013950 A2 * | 11/1990 |
| WO | 98/40980 | 9/1998 |
| WO | 02/11309 A1 | 2/2002 |
| WO | 02/11386 A1 | 2/2002 |
| WO | 02/11387 A1 | 2/2002 |
| WO | 2008/134257 A1 | 11/2008 |
| WO | WO 2010066289 A1 * | 6/2010 |
| WO | 2012/021299 A1 | 2/2012 |

* cited by examiner

MAINS-SYNCHRONOUS POWER-LINE COMMUNICATIONS SYSTEM AND METHOD

REFERENCE TO RELATED APPLICATIONS

This application is a U.S. national stage application of International Patent Application No. PCT/US2011/062510, filed Nov. 30, 2011, and claims the benefit of U.S. Provisional Application No. 61/419,091, filed Dec. 2, 2010 and claims the benefit of U.S. Provisional Application No. 61/442,956, filed Feb. 15, 2011, the entire disclosures of which are incorporated herein by reference.

BACKGROUND OF THE INVENTION

Automated meter reading (AMR) and advanced metering infrastructure (AMI) are technologies used for the wireless monitoring and control of remote systems. Used by various utilities, these technologies allow users to centrally monitor and control the flow of resources to reduce environmental risks and efficiently manage operations.

Very low frequency (VLF) power line communications (PLC) presently has widespread use in AMR/AMI deployments and may also be useful for smart grid applications, largely due to its excellent propagative properties. However, noise within the VLF band is more energetic than at higher frequencies and without effective noise mitigation degrades channel capacity, possibly to the point of making the band impractical.

Paired transmission lines and other devices on the grid are not conducive to high frequency carrier signals. Signals within the VLF band (and those below it) have the advantage of propagating over very long distances. The TWACS communication system, resides within the extremely low frequency band (ELF) and has very little, if any, signal attenuation over distances up to 100 miles, for example. While successful low frequency band (LF) links have been demonstrated over distances of 2 to 6 km as have broadband links over distances of 1 km, in many deployments a complete substation-to-meter link cannot be established in these bands without introducing signal boosters or repeaters.

One disadvantage to using the VLF band is reduced data rate due to decreased available bandwidth. Another objection to VLF PLC is that the noise increases with decreasing frequency. Thus, while desirable propagative properties of the medium may yield high signal energies, the effect may be offset by a disproportionate increase in noise power.

SUMMARY OF THE INVENTION

In one embodiment, the invention comprises a two-way communications system used by an electrical utility wherein the system sends outbound messages and receives inbound messages over the utility's power distribution system supplying a mains signal.

In one aspect, a signal modulator provides a communications signal including a message modulated on a carrier signal. A transmitter receives the communications signal and transmits a corresponding outbound message signal via the power distribution system. The transmitter includes a phase-locked loop linked to the outbound message signal for locking the phase of the respective outbound message signals to the mains signal. The transmitter also includes a spreader for spreading the spectrum of the communications signal before transmitting the outbound message signal. The outbound message signal is orthogonal to a source of interference on the power distribution system.

In another aspect, a receiver includes an analog-to-digital converter receiving the outbound signal including an outbound message and converting the received signal to a corresponding digitized signal. A digital processor despreads the spectrum of the received digitized signal and digitally demodulates the received despread signal to provide the outbound message.

In another aspect, the combination of the transmitter and the receiver comprise a system according to one embodiment of the invention. It is also contemplated that the transmitter may be used with other receivers to comprise a system according to one embodiment of the invention. It is also contemplated that other transmitters in combination with the receiver may comprise a system according to one embodiment of the invention.

In another aspect, methods of the operation of the transmitter, receiver and system comprise embodiments of the invention.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The system and method can be used to send any message over a power line. Many power line communications systems go from meter to meter, rather than substation to meter, for example. Although the noise may be modeled as a cyclostationary random process, the cyclostationary model for actual power line noise is unnecessarily restrictive so that the invention is based on modeling the VLF PLC channel as having a non-trivial wide-sense periodic component.

The system and method of the invention compensates for PLC noise in the low frequency band (LF) and below. In particular, the system and method of the invention addresses the preponderance of periodic noise in these bands. This has important ramifications for receiver configurations and, when employed, the invention increases the post-processed SNR, making VLF PLC a more attractive prospect for smart grid communications. Receivers and transmitted waveforms of the invention penetrate the periodic noise leaving only the weaker, cyclostationary noise with which to contend.

Figure 1:
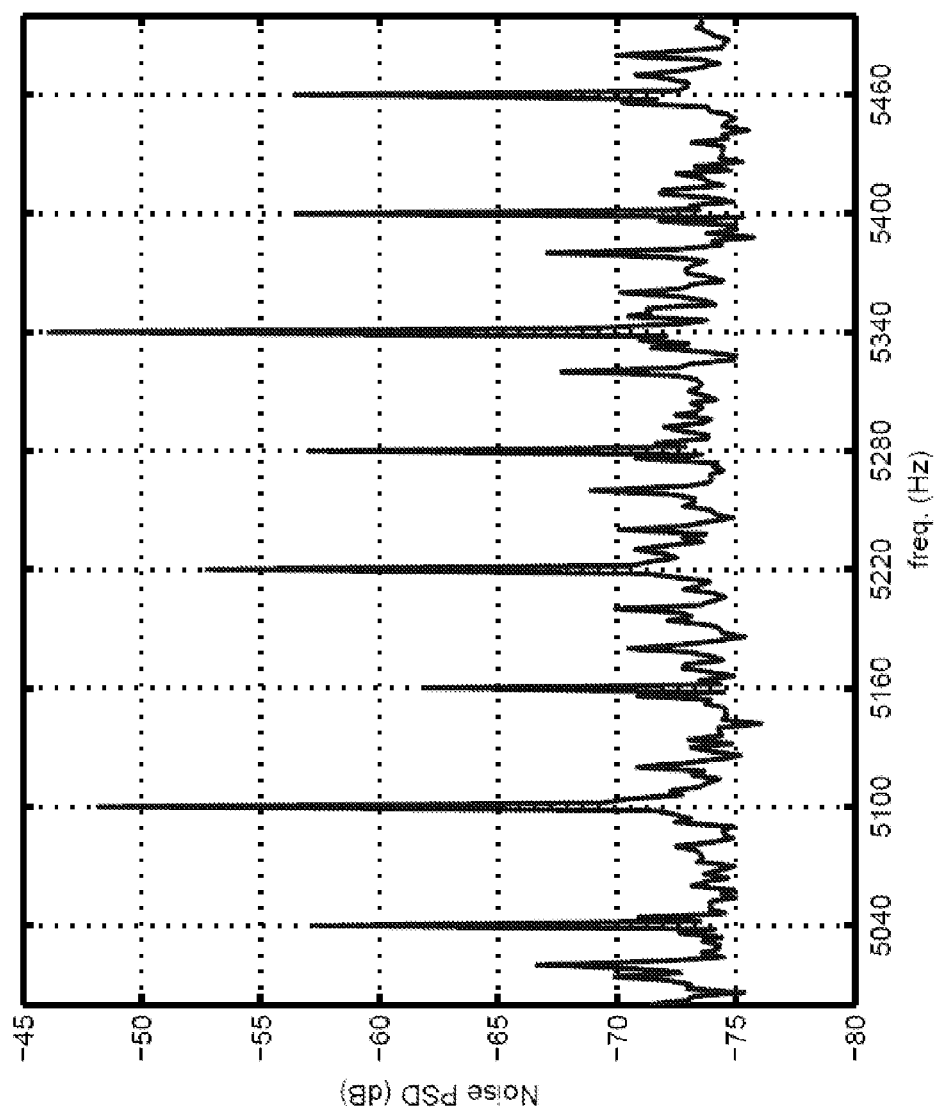
FIG. 1 illustrates one example of a power spectral density of power-line noise with 60 Hz harmonics labeled along the horizontal x-axis.

FIG. 1 illustrates one example of a power spectral density of a typical power-line voltage waveform plotted between 5 KHz and 5.5 KHz. FIG. 1 uses data obtained by sampling the output of a 120V wall outlet at 20 KHz for 87 seconds. A Welch periodogram was used with a window length of 1 second and an FFT size of 32768. FIG. 1 illustrates the presence of harmonics at integer multiples of 60 Hz. The harmonic nature of the noise is indicative of a temporal periodicity in the noise. This is consistent with the fact that the dominant signal present on a power line is the 60 Hz mains. The noise floor is at barely over −75 dB but there are narrowband sources at multiples of 60 Hz as much as 25 dB above the noise floor. This suggests a model in which noise comprises two sources, at least over this band. One source may be modeled as simply white noise (nominally AWGN). In this example, that would be the component at roughly −75 dB. The second source may be called power line interference (PLI), and represents the periodic component. Similar measurements at other sites may give a different result then illustrated in FIG. 1, although the harmonics will be present.

The system and method of the invention and, in particular, the algorithms used by the system and method of the invention estimate the noise directly according to the harmonics in FIG. 1, which are expected if the noise varies slowly from cycle to cycle. Since the mains-synchronous periodicity is modeled in the receiver and method of the invention, then the receiver fidelity is higher than receivers and methods which do not account for such harmonics. To illustrate this, consider a symbol length less than one mains cycle. If the noise over that symbol is examined without regard for noise outside the symbol interval, the harmonics illustrated in FIG. 1 will not be apparent. In fact, the harmonics will be spread out over bands proportional to the inverse of the symbol length, and thus blur together. In this example the noise could appear as white noise, although with a power of −50 dB or more.

According to an embodiment of the system and method of the invention, PLC signals are generated so that they are orthogonal to the PLI in a modified version of direct sequence spread spectrum (DS-SS). Signals may be generated using any modulation method, be it OFDM, BPSK (binary phase-shift keying), TWACS (two way automatic communications system) or others. However, before transmission the signal is operated on by a spreading code. This operation is phase-locked to the mains signal to ensure near orthogonality to the PLI. At the receiver the signal is despread, and it is in this despreading operation that PLI is essentially canceled, or at least sharply mitigated.

Advantages of this approach to PLC are that it may be applied to a wide range of PLC technologies, and it minimizes the need for sophisticated and computationally complex PLI estimation algorithms.

Figure 2:
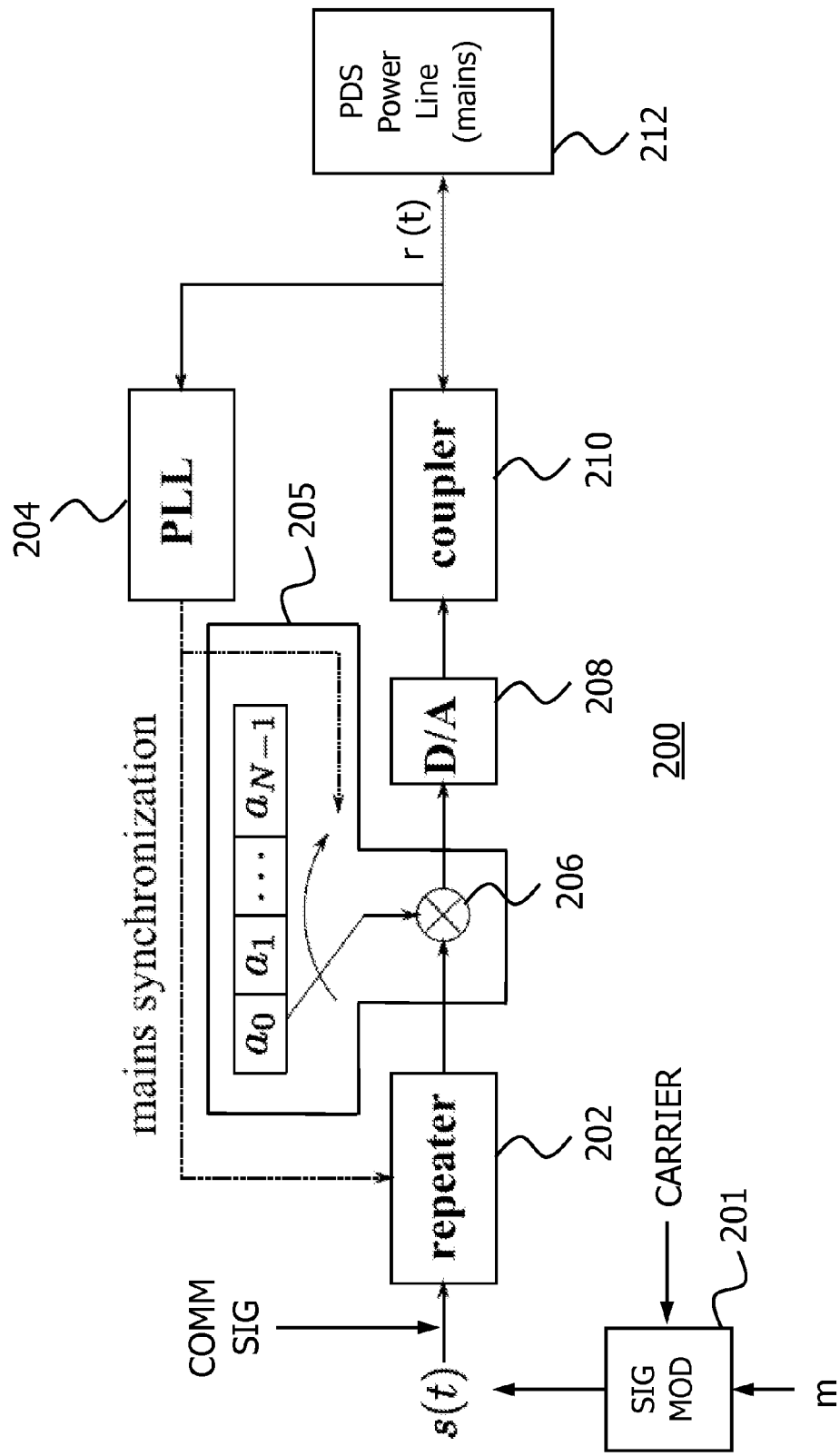
FIG. 2 is a block diagram of one embodiment of a transmitter for generating signals for mains-synchronous power-line communication by means of a spreading sequence.

It is interesting to note that TWACS and the resonating transmitter are both mains synchronous systems of this sort, although they may not have previously been considered so.
Transmitter FIG. 2 is a block diagram of one embodiment of a transmitter 200 for generating signals for mains-synchronous power-line communication by means of a spreading sequence. A communication signal, s(t), is provided from a signal modulator 201. This can be any kind of communications signal, so long as it can be truncated into blocks. A repeater 202 breaks the communications signal into lengths equal to one mains cycle or less with the aid of a phase-locked loop (PLL) 204 that is phase-locked to the mains to synchronize the repeater 202. Each block can be an integer number of symbols, frames, or code words. Blocks do not have to correspond to a particular number of symbols. For example, in one embodiment, the communication signal s(t) is subdivided by the repeater 204 into sub-signals with duration equal to or less than each mains cycle. Coefficients $a_n$ (n=0, 1, . . . , N−1) are spreading coefficients. Each cycle-length signal block from the repeater 204 is then transmitted N times. A modulator 206 modulates each nth cycle-length block by the real-valued scalar $a_n$. Note that the baud is reduced by a factor of N. The modulated blocks are converted from a digital signal to an analog mains signal by D/A converter 208. The analog signal is coupled to power lines of the power distribution system PDS 212 supplying the mains signal. The analog signal is transmitted over the power lines via a transformer or other coupling circuit illustrated as coupler 210 attached to the power lines to provide the transmitted output signal carried on the power distribution system PDS supplying the mains signal.

The transmitted output signal is coupled to the PLL 204 which, as noted above, synchronizes to the mains signal on the power distribution system PDS. This coupling occurs only insofar as both the coupler and the mains are connected to the mains. In some configurations, the presence of the transmitted signal could potentially degrade the PLL performance. In such configurations, some mitigative signal processing may be necessary in the PLL 204.

Thus, FIG. 2 illustrates one embodiment of the invention for a transmitter 200 for use in a two-way communications system used by an electrical utility to send outbound messages over the utility's power distribution system PDS supplying a mains signal. The transmitter 200 is for use with the signal modulator 201 providing a communications signal s(t) including a message m modulated on a carrier signal. The transmitter 200 transmits an outbound message signal r(t) via the power lines of the power distribution system PDS. As noted above, the transmitter includes the phase-locked loop (PLL) 204 linked to the outbound message signal r(t) for locking the phase of the respective outbound message signals to the mains signal. The transmitter includes the repeater 202 responsive to the PLL 204 for segmenting the communications signal s(t) into sections corresponding to one mains cycle. In addition, the transmitter 200 includes a spreader 205 for spreading the spectrum of the segmented communications signal before transmitting the outbound message signal r(t) by applying a spreading code to the segmented communications signal.

As illustrated in FIG. 2, in one embodiment, the spreader 205 includes a source of a series of spreading coefficients and a multiplier for multiplying each section of the communications signal by the series of spreading coefficients $a_n$ (n=0, 1, . . . , N−1). As noted below, the coefficients may be determined by subtraction so that the coefficients sum equals zero. As a result, the outbound message signal r(t) is orthogonal to a source of interference on the power distribution system PDS. This orthogonal aspect will be illustrated in more detail below.

In one embodiment, the invention is a method of generating the outbound messages comprising:
  providing a communications signal s(t) including a message m modulated on a carrier signal; and
  transmitting an outbound message signal r(t) corresponding to the communications signal s(t) via power lines of the power distribution system (PDS) supplying a mains signal, wherein said transmitting includes:
    locking the phase of the outbound message signal r(t) to the mains signal, and
    spreading the spectrum of the communications signal s(t) before transmitting the outbound message signal r(t) resulting in the outbound message signal being orthogonal to a source of interference on the power distribution system.

Figure 3:
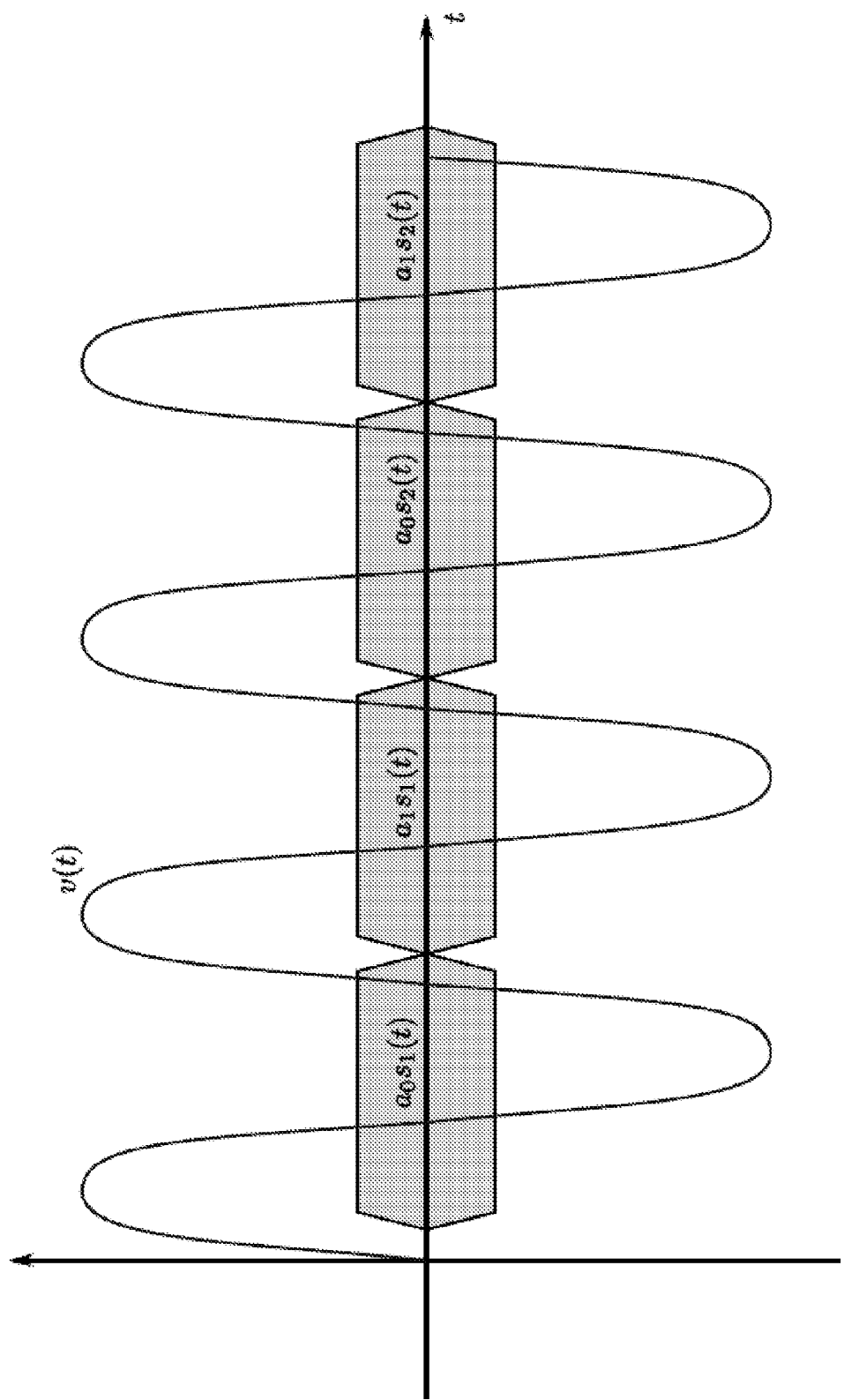
FIG. 3 illustrates the relationship of the transmitted signal to the mains wherein the mains-synchronous communication has a spreading length N=2.

The relationship of the transmitted output signal to the mains is demonstrated in FIG. 3. In this example, the spreading length is N=2, and two successive blocks are transmitted. The relative phase between the mains and transmitted output signal is not important, only that they are phase-locked. That is, each signal block must begin at the same point in every mains cycle. The high-voltage mains signal may inadvertently induce a time-varying gain on the transmitted output signal. This will manifest itself as a modulation of the transmitted output signal with a strong mains component. Using this approach this will appear as windowing of each transmitted block.

Orthogonal Relationship of Transmitted Output Signal to PLI (Power Line Interference)

For a signal s(t) repeated N times with period T and spreading coefficients $a_n$, the transmitted signal is:

$$z(t) = s(t) * \sum_{n=0}^{N-1} a_n \delta(t - nT) \quad \text{(III.1)}$$

where $\delta(t)$ is the delta-Dirac function. The Fourier transform of the transmittal signal is thus:

$$Z(f) = S(f)H(f) \quad \text{(III.2)}$$

where S(f) is the Fourier transform of s(t) and H(f) is:

$$H(f) = \int_{-\infty}^{\infty} \sum_{n=0}^{N-1} a_n \delta(t - nT) e^{j2\pi ft} dt \quad \text{(III.3)}$$

$$= \sum_{n=0}^{N-1} a_n e^{j2\pi fnT}$$

$$= A_d(2\pi fT).$$

$A_d(\lambda)$ is the discrete Fourier transform of the sequence [$a_0$ $a_1$ ... $a_{N-1}$]. The signal spectrum:

$$Z(f) = S(f) A_d(2\pi fT) \quad \text{(III.4)}$$

can therefore be made to be zero at mains harmonics by selecting $a_n$ so that $A_d(2\pi fT)=0$ at $f=n/T$ for all integer n. That is, $A_d(2\pi n)=0$. The only requirement for this is that:

$$\sum_{n=0}^{N-1} a_n = 0. \quad \text{(III.5)}$$

Figure 4:
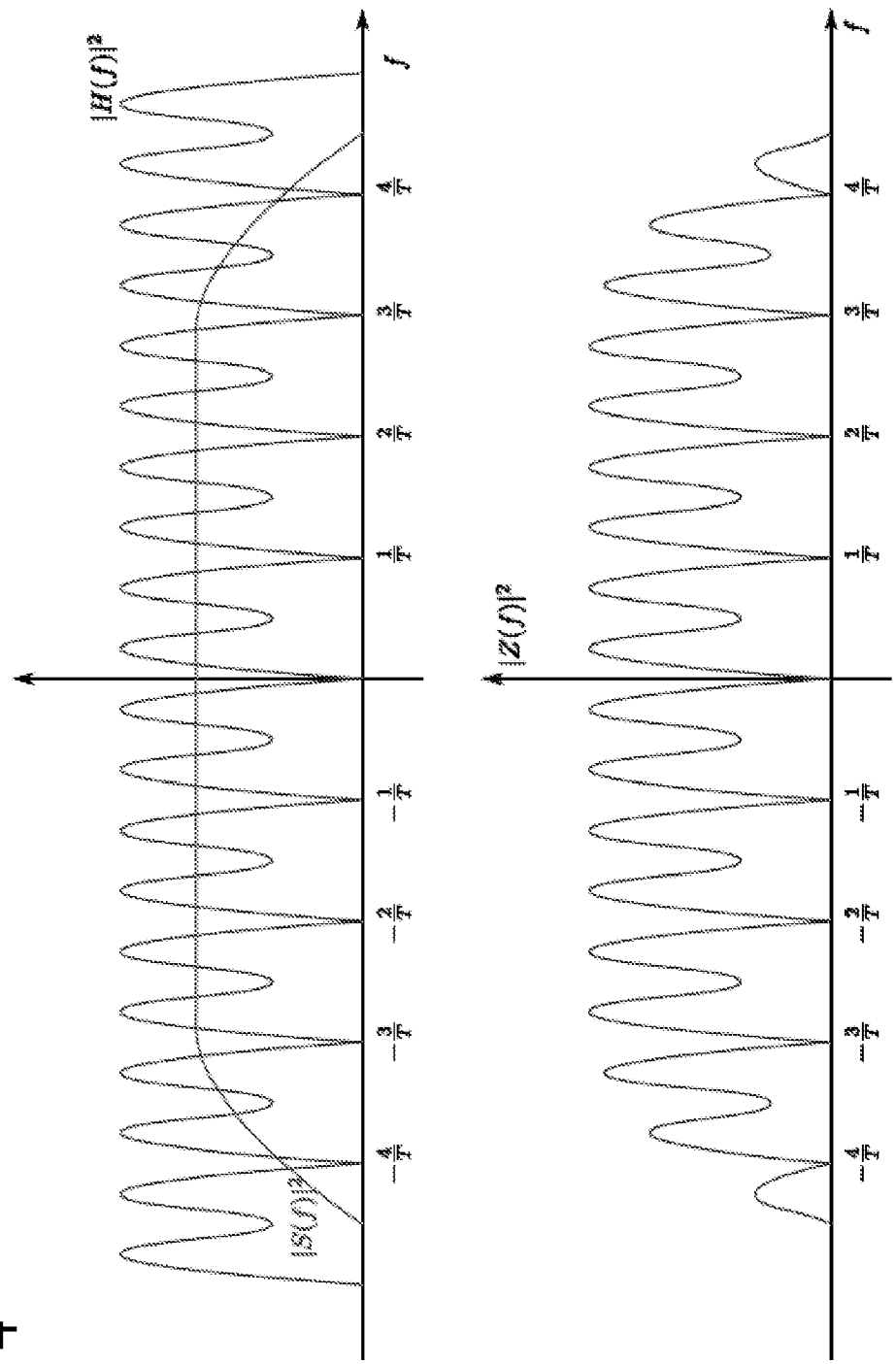
FIG. 4 illustrates graphically the spectrum of one example of an unmodified signal and the signal after it has been modified (spread) according to one embodiment of the invention.

Equation (III.4) under the condition specified by equation (III.5), that the sum of the coefficients equal zero, is demonstrated graphically in FIG. 4. The upper waveform of FIG. 4 illustrates graphically the spectrum of one example of an unmodified signal and the lower waveform is the signal modified (spread) according to one embodiment of the invention. The resulting spectrum (i.e., the lower waveform) is modified so that there is no energy coincident with the mains harmonics. Transmission of the signal in this way results in a signal that is substantially orthogonal to the dominant source of interference on the power line.

Orthogonal frequency-division multiplexing (OFDM) signals will necessarily have a sub-channel spacing of 1/T or more, where T is the symbol time. In practice it will be 1/T plus the guard interval. Sub-channel spacing will thus be very close to 1/T. The signal energy in any one channel is at least the energy in one 1/T sub-channel. To show that there is no energy loss in any one sub-channel consider the frequency interval [f, f+1/T]. By application of Parseval's theorem:

$$\int_f^{f+1/T} \|Z(f)\|^2 \, df = \sum_{n=0}^{N-1} \|a_n\|^2 \int_f^{f+1/T} \|S(f)\|^2 \, df. \quad \text{(III.6)}$$

Thus, the signal in any one sub-channel is the total power transmitted in that band. In fact, repeating the signal N times, although with a spreading code, increases the signal energy by a factor of N, provided $a_n$ are roots of unity.

OFDM Example

Consider an OFDM system operating between 1 KHZ and 9 KHz and a spreading code of length N=4 where:
$a_0=1$, $a_1=-1$, $a_2=1$, and $a_3=-1$.
Table 1 summarizes the OFDM system parameters.

TABLE 1

| Example OFDM system parameters | |
|---|---|
| N | 4 |
| bandwidth | 8 KHz |
| $T_g$ | 0.1 ms |
| sub-carriers | 132 |
| sub-carrier spacing | 60.36 Hz |
| $R_b$ (spectral efficiency = 1) | 1.98 kbps |

The guard interval, $T_g$, is set to compensate for channel length. Let us assume $100 \times 10^{-6}$ seconds, for no particular reason. For a 60 Hz mains, the symbol rate, $T_s$, must be such that:

$$T_s + T_g = 1/60$$

$$T_s = 16.57 \text{ ms}.$$

This corresponds to a sub-carrier spacing of 60.36 Hz. The number of subcarriers between 1 and 9 KHz is therefore 132. Assuming a spectral efficiency of 1, the data rate is:

$$R_b = 132 \text{ bits/symbol} \times 15 \text{ symbols/sec} = 1.98 \text{ kbps}.$$

There are only 15 unique symbols per second because of the length-4 spreading. By equation (III.6) there is a 6 dB gain in transmitted energy. The data rate depends on modulation used (e.g. QPSK (quadrature phase-shift keying), BPSK, differential BPSK) and code rate. This, in turn, depends on the SNR, which will be larger because of the coding gain.

Receiver

Embodiments of systems and methods of the invention may be used with any modulation method that produces signals s(t) with duration no longer than a mains cycle. The spreading method and system described above may be inserted after the signal is generated and before it is transmitted. Likewise, at the receiver, the despreading method is performed prior to demodulation.

The received signal, parsed with the aid of phase-locked loop, can be expressed as:

$$r = a(x) s + l_N(x) n. \quad \text{(IV.1)}$$

The transmitted signal, s, can be retrieved from r as demonstrated:

$$(a \otimes I)^T r = (a \otimes I)^T (a \otimes s) + (a \otimes I)^T (l_N \otimes n) \quad \text{(IV.2)}$$
$$= a^T a \otimes I^T s + a^T l_N \otimes I^T n.$$

Applying the condition in (III.5) that $a^T l_N = 0$ yields:

$$(a \otimes I)^T r = (a^T a) s. \quad \text{(IV.3)}$$

Since $a^T a$ is a positive scalar, the result is a scaled copy of the signal, which is fed to the signal processor.

Relationship of Spread Signal to PLI

In summary, the system and method of the invention minimize a dominant source of interference in power-line communications (PLC). Since the source is periodic and has the same period as the mains, the system and method modify the transmitted PLC signals so that the result is orthogonal to this noise. The system and method work with a variety of PLC modulation techniques to improve the signal-to-noise (SNR) ratio at the receiver.

Figure 5:
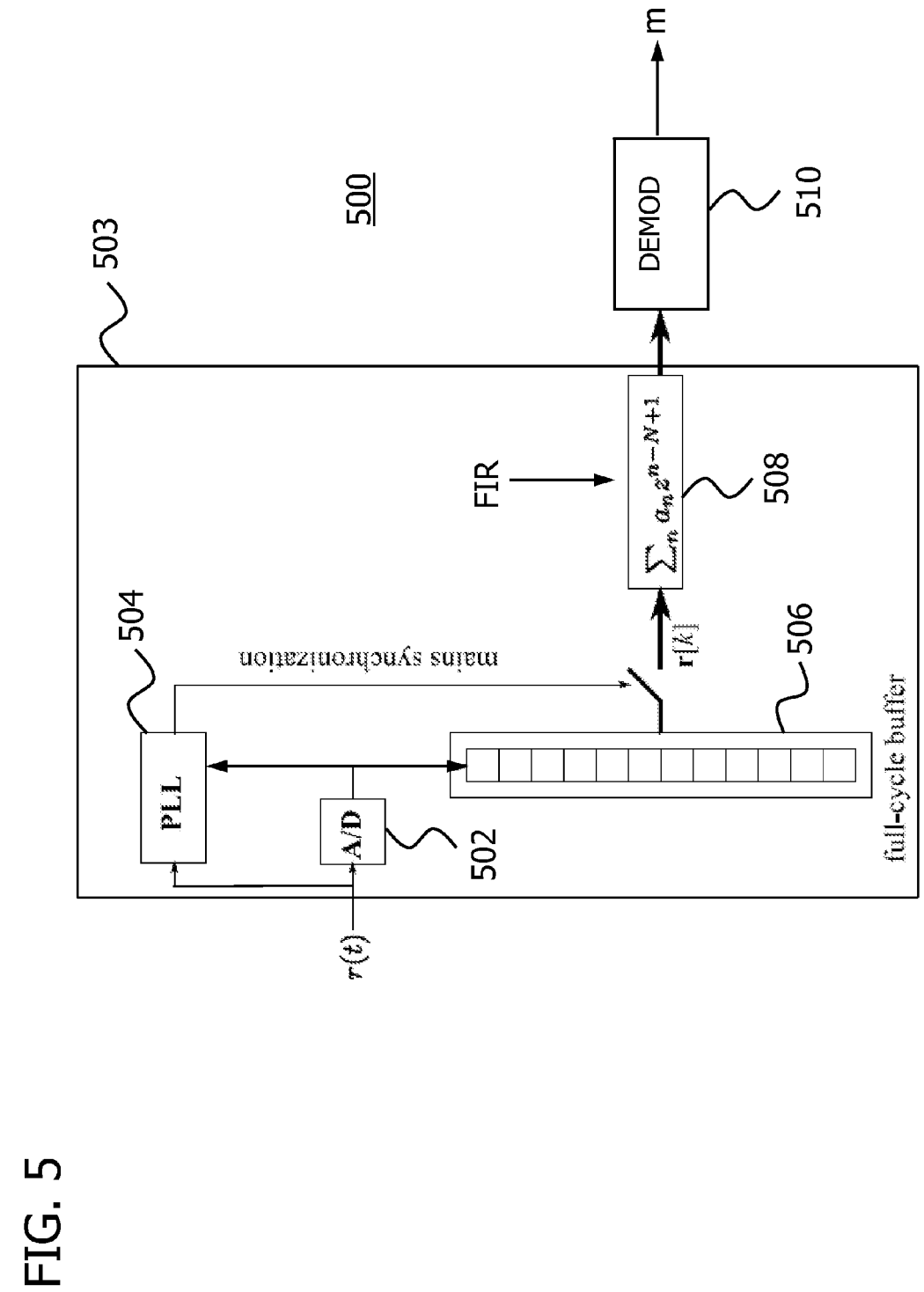
FIG. 5 is block diagram of one embodiment of a receiver preprocessor and demodulator of the invention.

One embodiment of a receiver pre-processor for implementing the invention is illustrated in FIG. 5. The received signal, r(t), is digitized by an analog to digital (A/D) converter 502 controlled by a digital phase-locked loop (PLL) 504 locked to the mains signal so that the received signal is parsed into full-cycle snapshots stored in a full cycle buffer 506. Alternatively, an analog PLL may be used as indicated by the dashed line.

In one embodiment, the receiver is implemented by a digital processor 503. The PLL 504 may be analog or digital as long as it has a digital output. As illustrated in FIG. 5 in one embodiment, the A/D converter 502, the PLL 504 and/or the buffer 506 may be part of the digital processor 503.

The matrix multiplication in equation (IV.3) is equivalent to:

$$(a \otimes I)^T r \to \left( \sum_{n=0}^{N-1} a_n z^n \right) r(z). \quad \text{(IV.4)}$$

This multiplication can be obtained in one embodiment of a receiver by operating on the full-cycle snapshots r[k] using a finite impulse response (FIR) filter 508 using the spreading coefficients $a_n$ (n=0, 1, ..., N-1):

$$H(z) = \sum_{n=0}^{N-1} a_n z^{n-N+1} \quad \text{(IV.5)}$$

The output of the FIR filter 508 is provided to a demodulator 510 for detecting the messages m. Although not illustrated in FIG. 5, it is contemplated that the demodulator 510 may be part of the digital processor 503. In general, parsing and despreading of a corresponding received spread output signal r(t) tends to result in eliminating deterministic harmonic components of the noise in an output signal, although the receiver 500 may have to deal with residual, non-periodic noise components.

Thus, FIG. 5 illustrates one embodiment of the invention for a receiver 500 for use in a two-way communications system used by an electrical utility in which outbound messages are sent from the utility to send receive inbound messages over the utility's power distribution system PDS supplying a mains signal. The receiver 500 detects the corresponding outbound messages m transmitted on the power lines. The A/D converter 502 receives the outbound signal including an outbound message m and converts the received signal to a corresponding digitized signal. The digital processor despreading the spectrum of the received digitized signal and digitally demodulating the received despread signal to provide the outbound message.

As illustrated in FIG. 5, the digital processor 503 implements the phase-locked loop (PLL) 504 locked to the mains signal. In addition, the digital processor 503 implements a parser synchronized to the PLL 504 for parsing the received signal into full-cycle snapshots and implements a despreader for despreading the snapshots. The parser as shown in FIG. 5 comprises the A/D converter 502 synchronized to the PLL 504 to create full-cycle snapshots stored in the buffer 506. In one embodiment, the despreader comprises the FIR filter 508 (illustrated in z notation) for multiplying and summing the snapshots by a matrix of the spreading coefficients $a_n$ (n=0, 1, ..., N-1) used by the transmitter 200.

In one embodiment, the invention is a method for detecting the outbound messages comprising:
receiving an analog outbound signal r(t) including an outbound message m;
converting the received signal to a corresponding digitized signal r[k];
despreading the spectrum of the received digitized signal, such as by FIR filter 508;
digitally demodulating the received despread signal, such as by demodulator 510, to provide the outbound message m.

System Multiuser Access

The combination of the transmitter 200 of FIG. 2 and the receiver preprocessor 500 and demodulator of FIG. 5 comprises a system according to one embodiment of the invention. It is also contemplated that the transmitter 200 of FIG. 2 may be used with other receivers to comprise a system according to one embodiment of the invention. It is also contemplated that other transmitters in combination with the receiver preprocessor 500 and demodulator of FIG. 5 may comprise a system according to one embodiment of the invention.

Using orthogonal spreading codes, it is possible to increase the system data throughput by a factor of N-1. To illustrate this, consider two spreading codes $a_1$ and $a_2$ that, in addition to satisfying the constraint in (III.5) are also orthogonal:

$$a_1^T a_2 = 0. \quad \text{(V.1)}$$

If two transmitters broadcast signals $s_1$ and $s_2$, respectively, with these spreading codes and synchronize the symbols appropriately, the received signal, again in matrix form, is:

$$r = a_1 \otimes s_1 + a_2 \otimes s_2 + l_N \otimes n. \quad \text{(V.2)}$$

To receive the first transmission the receiver uses the matrix multiplication:

$$(a_1 \otimes I)^T r = (a_1 \otimes I)^T (a_1 \otimes s_1) + (a_1 \otimes I)^T (a_2 \otimes s_2) + \quad \text{(V.3)}$$
$$(a_1 \otimes I)^T (l_N \otimes n)$$
$$= a_1^T a_1 s_1 + a_1^T a_2 s_2 + a_1^T l_N n$$
$$= a_1^T a_1 s_1$$

where the last equality follows by (V.1) and (III.5). Thus the signal from competing transmitters is canceled out by the receiver without any modification. One solution lies in finding an orthogonal set of codes that also satisfy the constraint in (III.5). The Hadamard matrix can be used to this end. Consider codes of length N=4 derived from the corresponding Hadamard matrix:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}. \quad (V.4)$$

The rows are orthogonal to one another, which satisfies the condition in (V.1). Orthogonality to the first row guarantees that (III.5) is also satisfied, although row 1 is itself not a valid code. Using these codes three (3) transmitters may operate simultaneously, provided the spreading codes are synchronized in all three transmitters. Note that synchronization should not be difficult, since the mains provides the necessary timing.

In the example provided above where the data rate was 1.98 kbps, the total system throughput (assuming a spectral efficiency of 1) is:

$Q_b$=1.98 kbps×3=5.94 kbps.

In general, the throughput will be:

$Q_b=(N-1)R_b.$ (V.5)

In summary, advantages of this approach over a conventional approach include computationally simple and efficient methods and systems whereby PLI may be mitigated thus increasing the achievable data rate, although baud is reduced by a factor of N and SNR increases (by a factor of N assuming perfect PLI cancellation), and spectral efficiency will increase by less than N so that the single-user data rate will suffer.

Another advantage is that the system and method provide a mechanism for multiple-user access, thus increasing the system throughput.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of components, data and/or computer-executable instructions, such as program modules, stored one or more tangible non-transitory computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. In a two-way communications system used by an electrical utility wherein the system sends outbound messages and receives inbound messages over the utility's power distribution system supplying a mains signal, an apparatus comprising:

a signal modulator providing a communications signal s(t) including a message modulated on a carrier signal; and a transmitter receiving the communications signal and transmitting a corresponding outbound message signal via the power distribution system, wherein said transmitter includes:

a phase-locked loop (PLL) linked to the outbound message signal for locking the phase of the respective outbound message signals to the mains signal;

a repeater linked to and responsive to the PLL for segmenting the communications signal into sections, each section corresponding to one mains cycle and repeating each section in the outbound message signal N times where N is greater than one; and a spreader for spreading the spectrum of the segmented communications signal before transmitting the outbound message signal such that the outbound message signal transmitted by the transmitter is substantially orthogonal to a source of interference on the power distribution system wherein the spreader applies a spreading code to the segmented communications signal including multiplying each mains cycle section of the segmented communications signal by one of a series of spreading coefficients, each spreading coefficient defined as $a_n$ where $n=0, 1, \ldots, N-1$.

2. The apparatus of claim 1 further comprising a receiver comprising:

an analog-to-digital (A/D) converter receiving the outbound signal including an outbound message and converting the received signal to a corresponding digitized signal; and a digital processor despreading the spectrum of the received digitized signal and digitally demodulating the received despread signal to provide the outbound message.

3. In a two-way communications system used by an electrical utility wherein the system sends outbound messages and receives inbound messages over the utility's power distribution system supplying a mains signal, a method of generating the outbound messages comprising:

providing a communications signal including a message modulated on a carrier signal; and transmitting an outbound message signal corresponding to the communications signal via the power distribution system, wherein said transmitting comprises:

locking the phase of the outbound message signal to the mains signal, responsive to the phase of the mains signal, segmenting the communications signal into sections, each section corresponding to one mains cycle;

repeating each segmented section N times in the outbound message signal, where N is greater than one; and spreading the spectrum of the segmented communications signal before transmitting the outbound message signal such that the outbound message signal is orthogonal to a source of interference on the power distribution system wherein the spreading comprises applying a spreading code to the segmented communications signal and wherein the applying comprises multiplying each mains cycle section of the segmented communications signal by one of a series of spreading coefficients, each spreading coefficient defined as $a_n$ where $n=0, 1, \ldots, N-1$.

4. In a two-way communications system used by an electrical utility wherein the system sends outbound messages and receives inbound messages over the utility's power distribution system supplying a mains signal, a receiver for detecting the outbound messages, said receiver comprising:

an analog-to-digital (A/D) converter receiving the outbound signal including an outbound message and converting the received signal to a corresponding digitized signal; and a digital processor connected to the A/D converter and adapted to receive the digitized signal, wherein the digital processor comprises:

a phase-locked loop (PLL) connected to the source of the mains signal and locked to the mains signal; and a parser connected to the PLL and synchronized to the PLL for parsing the received signal into repeated full-cycle snapshots, wherein each full-cycle snapshot is repeated N times, where N is greater than one;

said digital processor connected to the parser, said digital processor configured to receive the full-cycle snapshots and configured to despread the spectrum of the full-cycle snapshots using N spreading coefficients to provide a despread signal and configured to digitally demodulate the despread signal to provide the outbound message;

wherein the despreader applies a spreading code to the full cycle snapshots of the parsed signal including despreading each full cycle snapshot by one of a series of spreading coefficients, each spreading coefficient defined as $a_n$ where $n=0, 1, \ldots, N-1$.

5. The receiver of claim 4 wherein the digital processor demodulates each of the despread snapshots.

6. The receiver of claim 4 further comprising:

a signal modulator providing a communications signal s(t) including a message modulated on a carrier signal; and a transmitter receiving the communications signal and transmitting a corresponding outbound message signal via the power distribution system, wherein said transmitter includes:

a phase-locked loop (PLL) linked to the outbound message signal for locking the phase of the respective outbound message signals to the mains signal;

a repeater linked to and responsive to the PLL for segmenting the communications signal into sections, each section corresponding to one mains cycle; and, a spreader for spreading the spectrum of the segmented communications signal before transmitting the outbound message signal such that the outbound message signal transmitted by the transmitter is substantially orthogonal to a source of interference on the power distribution system.

7. In a two-way communications system used by an electrical utility wherein the system sends outbound messages and receives inbound messages over the utility's power distribution system supplying a mains signal, a method for detecting the outbound messages comprising:

receiving an analog outbound signal including an outbound message;

converting the received signal to a corresponding digitized signal, said method characterized by:

parsing synchronized with the mains signal the digitized signal into repeated full-cycle snapshots, wherein each full-cycle snapshot is repeated N times, where N is greater than one;

despreading the spectrum of the full-cycle snapshots using N spreading coefficients to provide a despread signal wherein the despreading comprises applying a spreading code to the full cycle snapshots of the parsed signal including despreading each full cycle snapshot by one of a series of spreading coefficients, each spreading coefficient defined as $a_n$ where n=0, 1, . . . , N−1; and digitally demodulating the despread signal to provide the outbound message.

8. The method of claim 7 wherein the digital processor demodulates each of the despread snapshots.

\* \* \* \* \*